Dec. 12, 1961 C. E. BRANICK 3,012,272
DEVICE FOR INSERTING AIR BAGS IN PNEUMATIC TIRE CASINGS
Filed Dec. 10, 1959 5 Sheets-Sheet 1

INVENTOR.
CHARLES E. BRANICK
BY
Merchant & Merchant
ATTORNEYS

Dec. 12, 1961 C. E. BRANICK 3,012,272
DEVICE FOR INSERTING AIR BAGS IN PNEUMATIC TIRE CASINGS
Filed Dec. 10, 1959 5 Sheets-Sheet 2
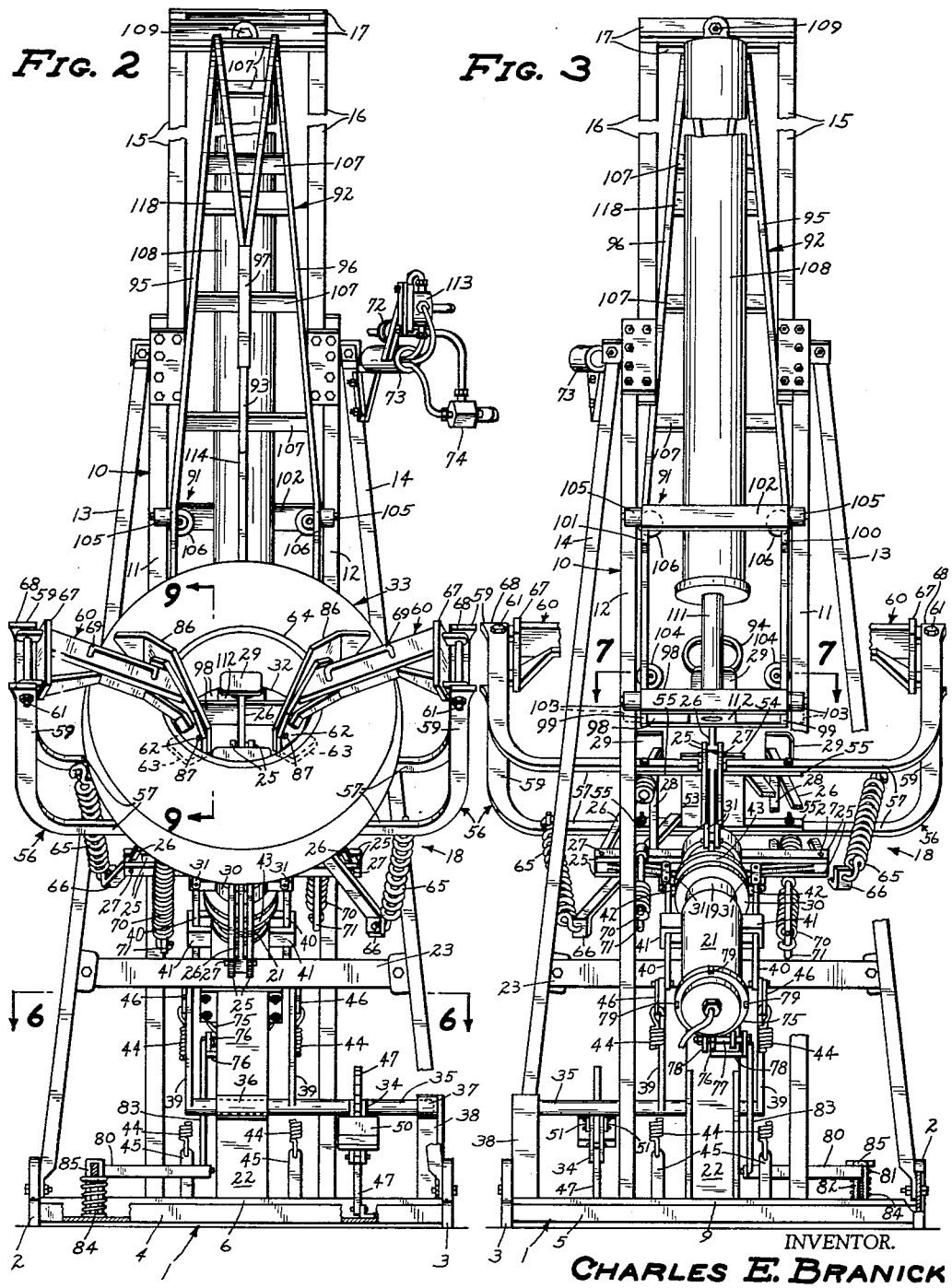
INVENTOR.
CHARLES E. BRANICK
BY
Merchant & Merchant
ATTORNEYS

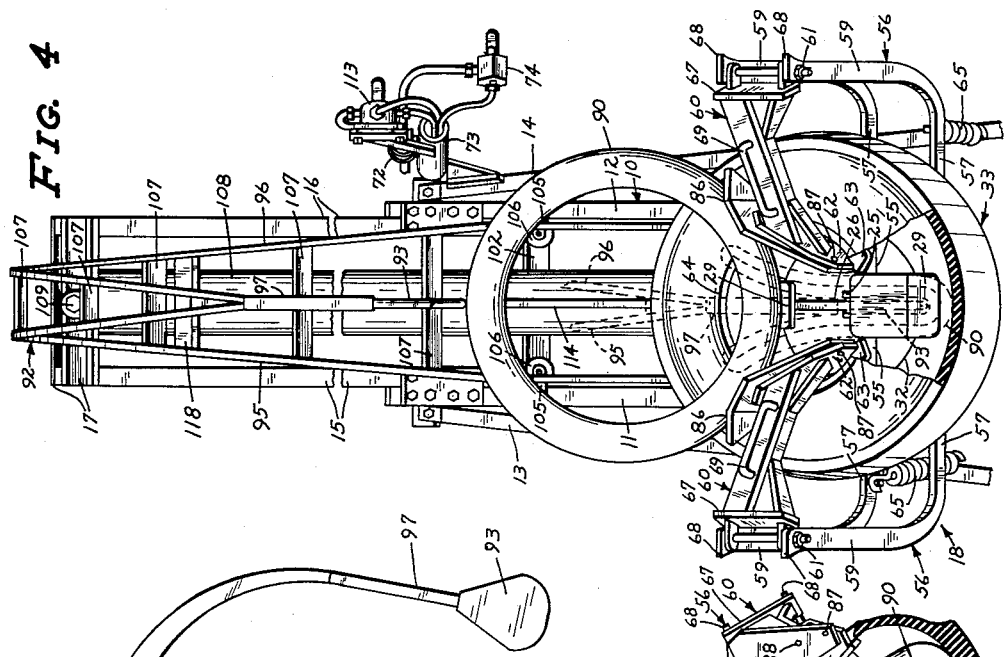

Dec. 12, 1961 C. E. BRANICK 3,012,272
DEVICE FOR INSERTING AIR BAGS IN PNEUMATIC TIRE CASINGS
Filed Dec. 10, 1959 5 Sheets-Sheet 4

INVENTOR.
CHARLES E. BRANICK
BY
Merchant & Merchant
ATTORNEYS

Dec. 12, 1961     C. E. BRANICK     3,012,272
DEVICE FOR INSERTING AIR BAGS IN PNEUMATIC TIRE CASINGS
Filed Dec. 10, 1959     5 Sheets-Sheet 5
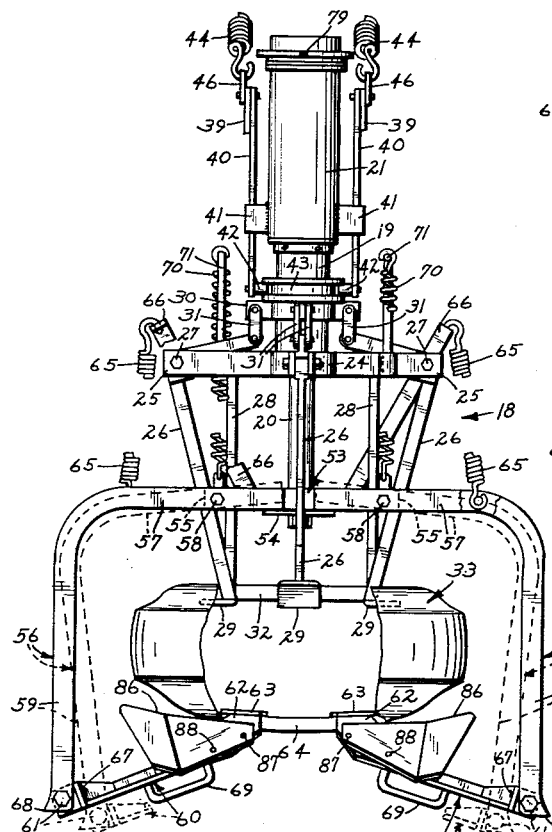
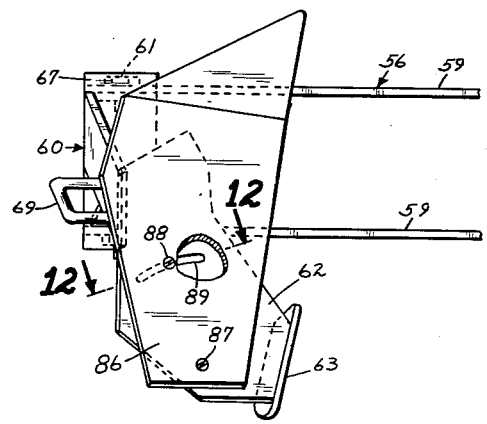
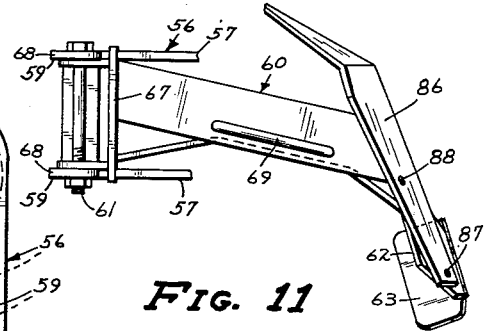
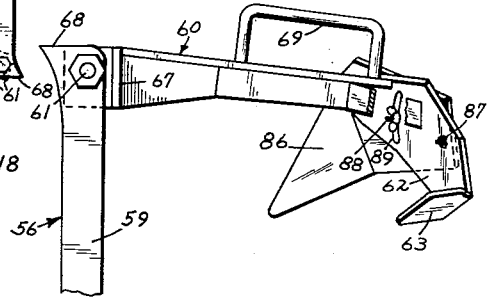
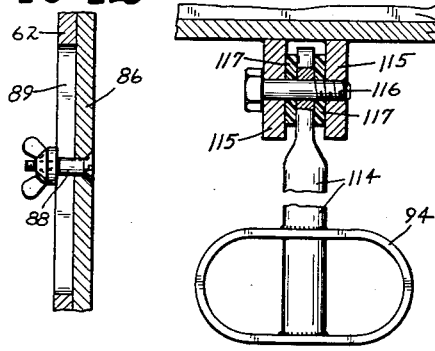
INVENTOR.
CHARLES E. BRANICK
BY
Merchant & Merchant
ATTORNEYS

# United States Patent Office 3,012,272
Patented Dec. 12, 1961

3,012,272
DEVICE FOR INSERTING AIR BAGS IN PNEUMATIC TIRE CASINGS
Charles E. Branick, P.O. Box 1937, Fargo, N. Dak.
Filed Dec. 10, 1959, Ser. No. 858,773
4 Claims. (Cl. 18—2)

My invention relates generally to pneumatic tire handling equipment, and more particularly to devices for inserting annular inflatable air bags into tire casings preparatory to retreading or recapping the tire casings.

In retreading or recapping a worn pneumatic tire, an inflatable air bag resembling an inner tube, but usually made from heavier stock capable of resisting heat and pressure, is inserted into the tire casing and inflated to exert sufficient radially outward pressure to the tire against the retreading mold to insure a firm bond between the tire and the new tread rubber during the curing of the new rubber. The weight and material thickness of such air bags is such that considerable manual effort is expended in placing the same within a tire casing and removing the same from the casing after the retreading operation is completed. An important object of my invention is therefore, the provision of a device by means of which an air bag may be quickly and easily placed in a tire with a minimum of effort by the operator.

Another object of my invention is the provision of novel tire spreader construction by means of which a tire is supported and spread in a manner to easily receive the air bag, and which permits thorough visual inspection of the interior of the tire when the beads thereof are spread apart.

Another object of my invention is the provision of a device as set forth having novel guide means for supporting an air bag and guiding the same into a spread tire casing, and of an air bag engaging an inserting member which cooperates with said guide means to fold the air bag between the guide means and insert the bag into the tire.

Another object of my invention is the provision of a tire supporting and spreading device which supports the spread tire at a given angle, and of means for mounting an air bag engaging and inserting member for movements at an oblique angle to the plane of one side of said tire, whereby the air bag is moved by said member angularly toward the interior of the tire.

Another object of my invention is the provision of air bag guide means as set forth, comprising cooperating guide elements which are adjustable in a manner to properly guide air bags into tires of various rim diameters.

Still another object of my invention is the provision of novel means for inverting a portion of a tire, after the retreading operation, to facilitate removal of the air bag from the tire.

To accomplish the above ends, I provide a machine comprising, a base, a tire spreader mounted on the base, frame structure defining a guideway extending generally upwardly from the base, a carriage movable on said guideway, a boom mounted on said carriage, an air bag engaging head on the boom, guide elements on said spreader for supporting and guiding an air bag into a spread tire on said spreader when the carriage is moved in a given direction, whereby the head engages the air bag, and a tire inverter mounted on said boom and movable between an inoperative storage position adjacent the boom and an operative position for engagement with a road-engaging crown portion of the tire on said spreader and responsive to movement of the carriage in one direction to invert the engaged portion of the tire.

The above, and still further highly important objects and advantages of my invention, will become apparent from the following detailed specification, appended claims, and attached drawings.

Referring to the drawings, which illustrate the invention, and in which like reference characters indicate like parts throughout the several views:

FIG. 2 is a view in front elevation, some parts being broken away;

FIG. 3 is a view in rear elevation, some parts being broken away;

FIG. 4 is a fragmentary view in front elevation, showing the operation of my device in inserting an annular inflatable air bag into a tire, some parts being broken away and some parts shown in section;

FIG. 5 is a fragmentary view in side elevation, corresponding to a portion of FIG. 1, but showing a different position of some of the parts;

FIG. 8 is a fragmentary view in plan of the tire spreader of my invention, some parts being broken away and some parts being shown in section;

FIG. 9 is an enlarged fragmentary view in side elevation as seen from the line 9—9 of FIG. 2, some parts being removed;

FIG. 10 is a fragmentary view in front elevation as seen from the left with respect to FIG. 9;

FIG. 11 is a fragmentary view in bottom plan of the detail of FIGS. 9 and 10;

FIG. 12 is an enlarged fragmentary section taken on the line 12—12 of FIG. 9; and FIG. 13 is an enlarged fragmentary detail, partly in section and partly in front elevation, taken on the line 13—13 of FIG. 1.

Figure 1:
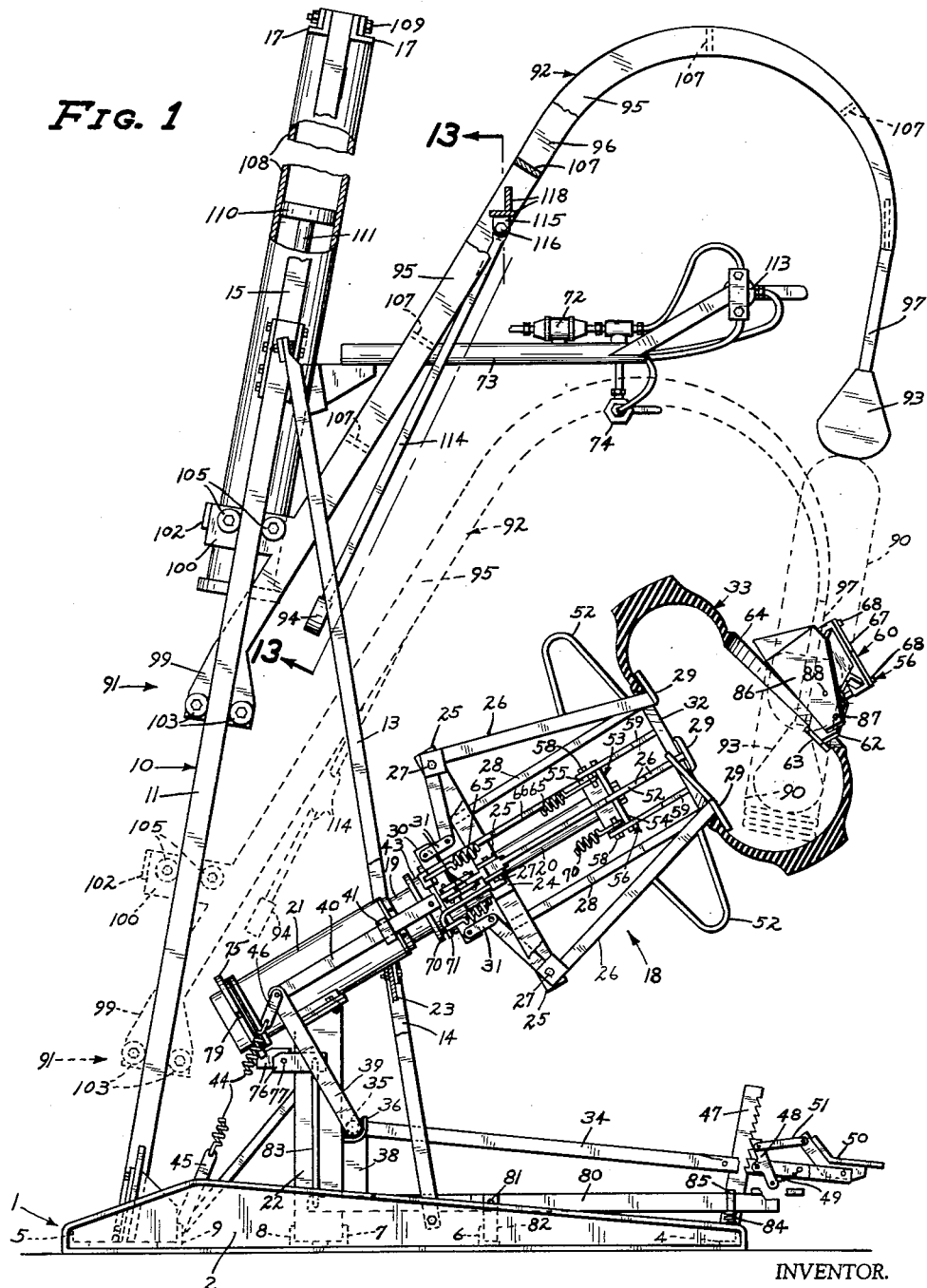
FIG. 1 is a view in side elevation of a device made in accordance with my invention, some parts being broken away and some parts being shown in section.

In the preferred embodiment of the invention illustrated, a generally rectangular base is identified in its entirety by the numeral 1, the base 1 comprising laterally spaced side members 2 and 3 respectively, front and rear cross members 4 and 5 respectively and intermediate brace members 6, 7, 8 and 9. The base is preferably made from structural steel components, the side members 2 and 3 being cross sectionally channel shaped, the cross members 4–9 being made from commercially available angle iron or the like, and anchored at their opposite ends to the side members 2 and 3 by welding or other suitable means.

The frame of my invention, which includes the base 1, further comprises generally upright frame structure 10 which includes a pair of laterally spaced frame members 11 and 12, preferably made from cross sectionally rectangular steel tubing or the like. The frame members 11 and 12 are rigidly secured at their lower ends to the rear end portion of the base 1 and incline forwardly and upwardly therefrom in spaced parallel relation, said frame members being supported at their upper ends by respective brace members 13 and 14 that are bolted or otherwise rigidly secured at their upper ends to the upper ends of their respective frame members 11 and 12, and which are likewise bolted or otherwise rigidly secured at their lower ends to respective side members 2 and 3 of the base 1. The frame structure 10 further includes laterally spaced parallel extension members 15 and 16 that are bolted or otherwise rigidly secured at their lower ends to the upper ends of the frame members 11 and 12 respectively, and which are connected at their upper ends by cross bars 17, for a purpose which will hereinafter become apparent.

A tire spreader, indicated in its entirety by the numeral 18, includes a fluid pressure cylinder 19 and a piston equipped plunger rod 20 mounted in the cylinder 19 for extending and retracting movements relative thereto. The cylinder 19 is journalled for rotation on its own axis in an elongated cylindrical bearing member 21 which is supported on a rigid standard 22, the lower end of which is welded or otherwise rigidly secured to the intermediate cross members 7 and 8 of the base 1. The common axis of the bearing 21, cylinder 19 and plunger rod 20 is inclined forwardly and upwardly, being disposed at an oblique angle to the plane of the frame structure 10, see particularly FIG. 1. The cylindrical bearing 21 is further supported by a cross member 23 rigidly connected at its opposite ends to the brace members 13 and 14. A spider 24 is rigidly secured to the front end of the cylinder 19 and includes a plurality of radially outwardly projecting legs 25, to the outer ends of which are pivotally secured circumferentially spaced inner spreader arms 26, as indicated at 27. The inner spreader arms 26 are in the nature of bellcranks, the arms of which are connected by brace rods or the like 28. The front ends of the inner spreader arms 26 are provided with tire bead-engaging elements 29, and the rear end portions of the arms 26 radially inwardly of the pivot connections 27, are operatively connected to a shifter collar 30 by rigid links 31 pivotally connected at their opposite ends to the spreader arms 26 and the shifter collar 30. The collar 30 slidably encompasses the front end portion of the fluid pressure cylinder 19 intermediate the front end of the cylindrical bearing 21 and the spider 24. The arrangement is such, that axial forward and rearward movements of the shifter collar 30 imparts radially outward and inward movements respectively to the tire bead-engaging elements 29, whereby the bead engaging elements 29 are adapted to move radially into and out of operative engagement with the generally rearwardly disposed bead portion 32 of a tire, indicated in its entirety by the reference character 33.

Figure 6:
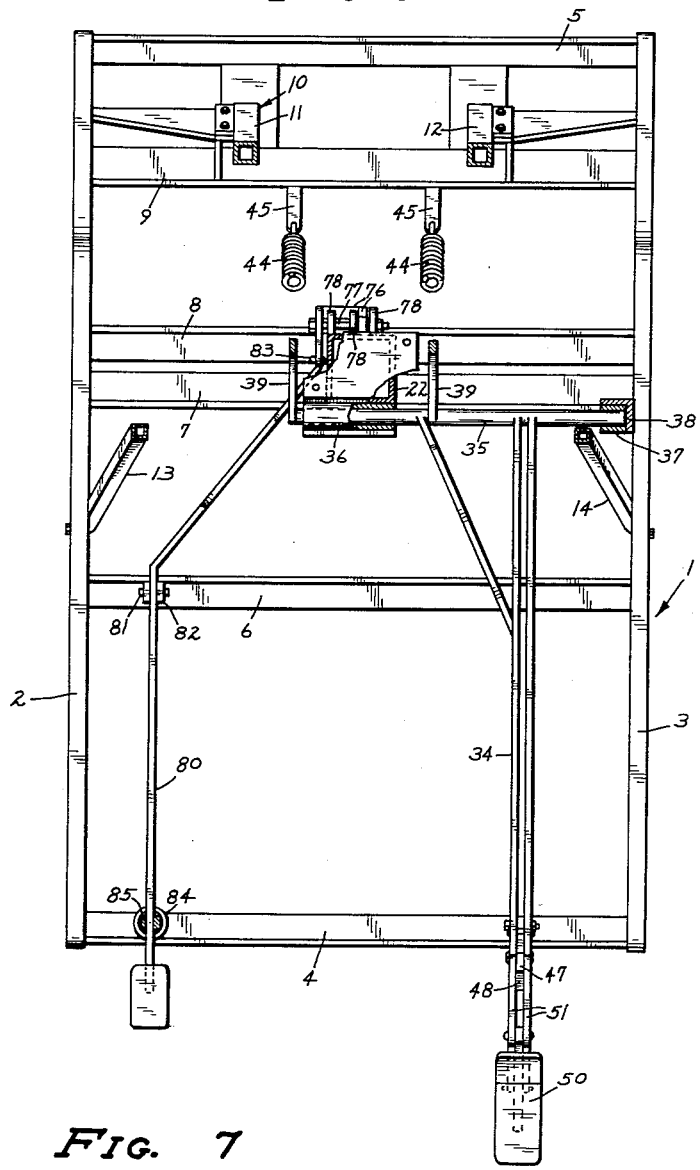
FIG. 6 is a view partly in plan and partly in horizontal section, taken substantially on the line 6—6 of FIG. 2, some parts being removed.
Figure 7:
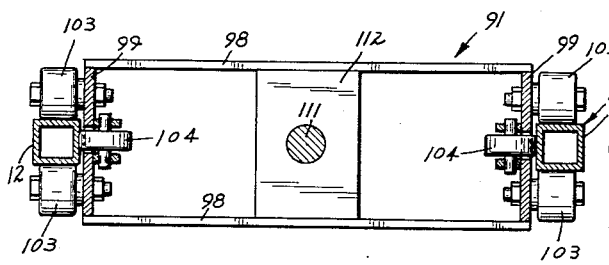
FIG. 7 is a fragmentary section taken substantially on the line 7—7 of FIG. 3.

Means for imparting axial movements to the shifter collar 30 comprises a treadle arm 34 rigidly secured at its rear end to a rockshaft 35 that is journalled in bearings 36 and 37 on a horizontal axis extending transversely of the machine, the bearing 36 being rigidly secured to the standard 22 and the bearing 37 being mounted on the upper end of a mounting bracket or the like 38 rigidly secured to the side member 3 of the base 1. A pair of laterally spaced parallel crankarms 39 are rigidly secured at their lower ends to the rockshaft 35 and extend upwardly and rearwardly therefrom, being pivotally secured at their upper ends to the rear ends of a pair of links 40, one at each side of the cylindrical bearing 21 and guided for axial sliding movements relative thereto by bearing bosses or the like 41 projecting radially outwardly from opposite sides of the bearing 21. The front ends of the links 40 are provided with rollers 42 that project radially into a circumferential groove 43 in the shifter collar 30. A pair of coil tension springs 44 are connected at their lower ends to the intermediate cross member 9 by means of straps 45, and at their upper ends to other connector straps 46 that are pivotally connected to the upper rear ends of the crank arms 39, see particularly FIGS. 1 and 3. The springs 44 yieldingly urge the crank arms 39 in a direction to move the shifter collar 30 rearwardly to impart radially inward movement to the front ends of the inner spreader arms 26 and the bead engaging elements 29 carried thereby. The treadle arm 34 is bifurcated, as shown in FIG. 6, to receive a ratchet bar 47 that extends upwardly from the front cross member 4 of the base 1. A pawl 48 is pivotally secured to the treadle arm 34 adjacent the ratchet bar 47 and is yieldingly urged into an operative engagement therewith by a coil tension spring 49, see FIG. 1. A treadle 50 is pivotally mounted on the front end of the treadle arm 34 and is operatively connected to the pawl 48 by a rigid link 51 pivotally connected at its opposite ends to the pawl 48 and treadle 50. Pivotal movement of the treadle 50 in one direction will release the pawl 48 from latching engagement with the ratchet bar 47, against yielding bias of the spring 49, to permit the treadle arm to be swung upwardly by the springs 44 to radially contract the front ends of the inner spreader arms 26. When the tire 33 is placed over the front ends of the inner spreader arms 26, the treadle arm 34 is moved downwardly by pressure of the operator's foot on the treadle 50 to spread the front ends of the inner spreader arms 26 into engagement with the bead 32 of the tire 33, the bead-engaging elements 29 engaging the inner wall surface portions of the tire 33 adjacent the bead 32 thereof. As above indicated, the spring 49 yieldingly urges the pawl 48 into latching engagement with the ratchet bar 47 to releasably lock the treadle arm 34 in its position wherein the tire bead 32 is engaged by the outer ends of the inner spreader arms 26.

As shown particularly in FIG. 1, the spreader arms 26 of a diametrically opposed pair thereof are provided with generally vertically disposed guide fingers 52 which aid in supporting the tire 33 on the inner spreader arms in a position to be engaged by the bead-engaging portions or elements 29 until the inner arms 26 are moved to their spread positions of FIG. 1. With this arrangement, the operator is assured that, when the inner arms are moved to their expanded bead-engaging positions, the axis of the tire will be aligned with the axis of the tire spreader, and all of the bead-engaging elements 29 in proper engagement with the bead portion 32 of the tire 33.

Rigidly secured to the front end of the plunger rod 20 is a cross piece 53 comprising a stop plate 54 and opposed pairs of spaced generally radially outwardly projecting ears 55. A pair of diametrically opposed bifurcated outer spreader arms 56 each comprise generally radially projecting portions 57 that are pivotally secured to the outer end portions of the ears 55, as indicated at 58, intermediate portions 59 which extend in directions generally parallel to the axis of the spreader, and front end portions or sections 60 that are pivotally secured to the front ends of the intermediate portions 59, as indicated at 61, and which normally extend in directions generally radially inwardly toward the axis of the spreader. At their inner ends, the front end arm sections 60 are provided with plate-like mounting members 62 which terminate in inturned tire bead-engaging elements in the nature of flat ears or lugs 63 that are adapted to engage the inner wall surface of the tire adjacent the forwardly disposed bead 64 thereof. The pivotal connections 58 permit the outer spreader arms 56 to be swung inwardly to permit insertion of the bead-engaging elements 63 into the tire 33, as indicated by dotted lines in FIG. 8, and are yieldingly urged in a generally outward direction of swinging movement by a pair of coil tension springs 65 that are connected at one end to respective ones of the arms 56 radially outwardly of the pivot connections 58, and at their other ends to the rear ends of anchoring bars or the like 66 that extend generally rearwardly from the cross piece 53. The above mentioned generally outward swinging movement of the arms 56 is limited by engagement of the radially inner ends of the rear end arm portions 57 with the stop plate 54. The front end arm sections 60 are provided with stop flanges 67 that are adapted to selectively engage adjacent inner sides of the intermediate arm portions 59 and front end surfaces 68 thereof whereby swinging movements of the front end arm sections 60 is limited in opposite directions. The arm sections 60 are further provided with generally U-shaped handle elements 69 by means of which the same may be swung about the axes of the pivotal connection 61, and by means of which the outer arms 56, in their entirety, may be pivotally swung about the axes of the pivotal connections 58.

The plunger rod 20, together with the outer spreader arms 56 carried thereby, is yieldingly urged toward a retracted position with respect to the fluid pressure cylinder 19, by means of a pair of coil tension springs 70 which extend generally longitudinally of the spreader 18, and which are anchored at their front ends to the ears 55 of the cross piece 53, and at their rear ends to the rear ends of a pair of thrust rods 71 that are rigidly secured to, and extend rearwardly from a diametrically opposed pair of the spider legs 25. Fluid under pressure is introduced to the rear end of the cylinder 19 to impart extending movements to the plunger rod 20 from a suitable source of supply not shown, but which may assume to be connected to a connector fitting 72 that is mounted on a supporting bar 73 that extends forwardly from the upper end portion of the frame member 12. Control of fluid admitted to the cylinder 19 is had through a conventional handle-equipped 3-way valve 74 carried by the front end of the supporting bar 73. The conduit connections between the control valve 74 and the fluid pressure cylinder 19, are shown but partially, the same being conventional in nature and detailed showing and description thereof being deemed unnecessary. When the valve 74 is manipulated to permit fluid to be exhausted from the rear end of the cylinder 19, the springs 70 cause the plunger rod 20 and spreader arms 56 to retract in a rearward direction. When it is desired to place a tire 33 on the spreader, the front end arm sections 60 are manually swung forwardly and outwardly until the stop flanges 67 engage the front ends of the intermediate arm portions 59, and the treadle arm 34 is unlatched to permit the springs 44 to radially retract the front ends of the inner spreader arms 26. The tire 33 is then placed on the retracted inner spreader arms and the treadle arm 34 pushed downwardly to spread the front ends of the inner spreader arms 26 into engagement with the rearwardly disposed bead 32 of the tire 33. The front end arm sections 60 of the outer spreader arms 56 are then swung inwardly, together with the intermediate portions 59 to place the bead-engaging elements or ears 63 into operative engagement with the forwardly disposed bead 64 of the tire 33. The yielding bias of the springs 65 cause the arms 56 to swing outwardly to maintain the ears or lugs 63 in their operative positions against the bead 64. The valve 74 is then manipulated to cause fluid under pressure to be introduced to the rear end portion of the cylinder 19, causing the outer spreader arms 56 to move forwardly to spread the tire, as shown in FIGS. 1, 5 and 8.

Inasmuch as the cylinder 19 is journalled in the cylindrical bearing 21, the spreader 18 may be rotated on its axis so that the interior of a spread tire mounted thereon may be quickly and easily inspected for internal damage. For the purpose of releasably locking the spreader 18 in desired set positions of its rotary movement on the axis of the bearing 21, I provide a locking ring 75 and a cooperating latch lever 76 which is pivotally mounted on a shaft 77 carried by a bracket 78 mounted on the standard 22. The latch lever 76 is adapted to be selectively received in any one of a plurality of radially outwardly opening notches 79 in the locking ring 75 to releasably lock the spreader mechanism against rotation. The latch lever 76 is controlled by a second treadle arm 80 that is pivotally connected intermediate itse ends, as indicated at 81, to a mounting bracket 82 extending upwardly from the intermediate cross member 6, and a rigid link 83 pivotally connected at its opposite ends to the latch lever 76 and second treadle arm 80. The treadle arm 80 is yieldingly urged in a direction to impart latching movement to the latch lever 76 by a coil compression spring 84 encompassing a guide pin 85 that extends upwardly from the front cross member 4 and through the front end portion of the second treadle arm 80, the spring 84 being interposed between the front cross member 4 and the treadle arm 80. Obviously, downward pressure on the front end of the second treadle arm 80 will cause the link 83 to move upwardly to swing the latch lever 76 in an unlatching direction.

For the purpose of mounting and guiding an elastic annular inflatable air bag 90 into the interior of the spread tire 33 mounted on the spreader 18, I provide a pair of plate-like guide members 86, each pivotally secured to a different one of the mounting plates 62, as indicated at 87. Wing nut-equipped screws 88, secured to the guide members 86, extend through arcuate slots 89 in the mounting plates 62, and provide means for releasably locking the guide members 86 in selected positions of pivotal movement about the axes of the pivotal connections 87. The above mentioned air bag is shown by full lines in FIGS. 4 and 5, and by dotted lines in FIGS. 1 and 4, and is identified by the reference character 90.

As hereinbefore pointed out, the air bag 90 resembles a conventional inner tube in appearance, the same differing from an inner tube in that air bags usually used in retreading operations have considerably greater wall thickness and are harder to manipulate than conventional inner tubes. An important feature of my invention, now to be described, is the mechanism for inserting the air bag 90 into the spread tire 33, and for otherwise manipulating the tire to facilitate removal of the air bag 90 from the tire 33 after the retreading operation has been completed. This mechanism involves a generally rectangular carriage 91 mounted on the frame members 11 and 12 for movement longitudinally thereof, a boom 92 mounted on the carriage 91 for common movements therewith, an air bag engaging head element 93 mounted on the free end of the boom 92, and an inverter foot 94 adapted to engage the top road-engaging crown surface portion of the tire 33 to invert the same, as illustrated in FIG. 5.

In practice, a portion of the boom 92 forms a part of the carriage 91, the boom 92 being of inverted generally U-shape and involving a pair of laterally spaced boom sections 95 and 96 that are substantially parallel at their lower rear end portions, and which converge toward the free end thereof where the same are joined to a depending extension section 97, the head element 93 being rigidly secured to the lower end of the extension section 97. The carriage 91 includes a pair of lower cross members 98 that are welded or otherwise rigidly secured to the enlarged lower ends 99 of the boom sections 95 and 96, a pair of upper carriage members 100 and 101 welded to the boom sections 95 and 96 respectively and extending rearwardly therefrom, and an upper cross bar 102 connecting the rear ends of the carriage members 100 and 101. Pairs of anti-friction rollers are suitably journalled to the enlarged lower ends of 99 of the boom sections 95 and 96 and engage front and rear surface portions of the frame members 15 and 16, and other anti-friction rollers 104 are suitably journalled in said enlarged end portions 99 for rolling engagement with the opposed inner faces of the frame members 11 and 12 to hold the bottom portion of the carriage 91 against lateral shifting. In like manner, pairs of anti-friction rollers 105 are journaled to the upper carriage members 100 and 101 for engagement with the front and rear surfaces of the frame members 11 and 12, and other anti-friction rollers 106 are journaled in the carriage members 100 and 101 for rolling engagement with the opposed inner surfaces of the frame members 11 and 12. The boom 92 is internally braced by a plurality of cross bars 107 that are welded or otherwise rigidly secured at their opposite ends to the upwardly and outwardly converging boom sections 95 and 96.

Means for imparting generally upward and downward movement to the carriage 91, the boom 92 and the head element 93, carried thereby, comprises a fluid pressure cylinder 108 disposed intermediate the frame extension members 15 and 16 and bolted or otherwise rigidly secured to the cross bars 17, as indicated at 109, a piston 110 axially slidable within the cylinder 108, a plunger rod 111 secured to the piston 110 for common axial movements therewith and extending outwardly of the lower end of the cylinder 108, and a crosshead 112 rigidly secured to the intermediate portions of the carriage cross members 98, the extreme outer or lower end of the plunger rod 111 being suitably connected to the crosshead 112. Fluid, such as air, under pressure, is introduced selectively to the upper and lower ends of the cylinder 108 from a source thereof not shown, through the fitting 72 and a conventional 3-way valve 113, to raise and lower the carriage 91 and parts carried thereby, as desired. The connections between the valve 113 and the opposite ends of the cylinder 108 are of well known construction, and not shown.

The inverter foot 94 is welded or otherwise rigidly secured to the lower end of an elongated leg 114, the upper end of which is pivotally secured between a pair of spaced ears 115 by means of a pivot bolt or screw 116. Friction washers 117 are interposed between the upper pivoted end of the leg 114 and the ears 115 to releasably hold the leg 114 against accidental swinging movements. The ears 115 are welded or otherwise secured to a cross member 118 that extends transversely between and welded at its opposite ends to the boom sections 95 and 96. The leg 114 is adapted to be pivotally swung about the axis of the screw 116 between an inoperative storage position generally parallel with the plane of the boom sections 95 and 96, as shown in FIG. 1, and an operative position angularly spaced therefrom, wherein the foot 94 is adapted to engage the top road-engaging crown surface portion of the tire 33, as shown in FIG. 5.

When it is desired to place the air bag 90 into the tire casing 33, the tire casing is mounted on the spreader 18 and the beads 32 and 64 spread apart as hereinbefore described. The spreader 18 is locked in its position of rotary movement in the bearing 21 in its position shown in the drawings, with the outer spreader arms being opposed in a generally horizontal direction. It will be noted that the bead-engaging elements 63 are disposed at a level below the axis of the tire so that, the beads thereof are spread apart, the tire bead 64 is spaced from the tire bead 32 further at the bottom portion of the tire than at the top portion thereof, thus facilitating the insertion of the annular air bag 90 into the tire. The air bag 90 is placed on the guide members 86 in a generally vertically disposed condition and, while being manually supported in this position, the valve 113 is manipulated by the operator to cause the carriage 91, boom 92, and head element 93, to move downwardly into engagement of the head element 93 with the top portion of the air bag. Continued downward movement of the carriage 91 causes the head element 93 to collapse the upper one-half of the air bag 90 into nesting relationship with the lower one-half thereof, and to move the entire collapsed air bag downwardly into the interior of the tire 33, the air bag 90 being guided into the interior of the tire by the guide members 86, as shown by dotted lines in FIGS. 1 and 4. The valve 113 is then manipulated to raise the carriage, boom and head element to its full line position of FIG. 1 whereby to permit the air bag 90 to resume its normal annular shape within the tire 33. In the event that the top portion of the collapsed air bag does not totally enter the tire during the downward stroke or movement of the head element 93, the same may be easily moved into the tire when the head element 93 is at its lowermost dotted line position of FIG. 1, by the operator. If desired, the usual backing ring, not shown, for the air bag may be inserted into the tire before removing the same from the spreader, after which the air bag 90 is inflated and the tire placed in the usual curing mold for finishing the retreading operation.

After the retreading operation is completed, and the back-up ring removed from the tire, the air bag 90 is deflated and the tire 33 with the air bag 90 therein, replaced on the spreader and the beads thereof spread by manipulation of the valve 74. The leg 114 is then swung about the axis of its pivot connection 116 until the inverter foot 94 overlies the top portion of the road-engaging tread of the tire 33, the valve 113 is then operated to cause downward movement to be imparted to the carriage 91, boom 92 and leg 114 to invert the tire 33 at its top portion, as shown in FIG. 5. When this occurs, the air bag 90 becomes partially collapsed, and can be easily grasped by the operator and manually removed from the interior of the tire. The tire 33 is then removed from the spreader in the usual manner, and is then ready for further use.

It will be appreciated that, when the tire 33 is initially spread and the air bag 90 placed therein, the spread condition of the tire 33 enables the operator to quickly and easily insert a collapsible metallic air bag engaging rim, not shown, into the tire. Such rims are extensively used in retreading tires and generally comprise a plurality of pivotally connected arcuate sections. In the interest of brevity, showing and description of the rim is omitted. It will be further appreciated that the supporting bar 73 is capable of supporting accessory devices, such as spot lights, not shown, whereby illumination may be directed to the interior of the tire, both from the front and the rear thereof, when the same is mounted on the spreader, whereby to facilitate inspection of the tire and general operation of the apparatus.

My invention has been thoroughly tested and found to be completely satisfactory for the accomplishment of the objectives set forth; and, while I have shown and described a commercial form of my tire handling device, it will be understood that the same is capable of modification without departure from the spirit and scope of the invention, as defined in the claims.

What I claim is:

1. In a machine for inserting annular inflatable air bags into pneumatic tire casings, a tire spreader including, a plurality of forwardly extending inner spreader arms having tire bead-engaging elements at the forward ends thereof for engaging circumferentially spaced portions of one of the spaced beads of a tire, a pair of generally forwardly extending outer arms disposed radially outwardly of the tire to be spread and having generally radially inwardly projecting front end portions terminating in bead-engaging elements engaging circumferentially spaced portions of the other bead of said tire, and means for moving said outer arms relative to said inner arms to spread the beads of said tire, a pair of downwardly converging plate-like guide members, means mounting said guide members on the inner ends of said front end portions of the outer arms in angularly disposed relationship to said tire and for adjustment of said angular relationship, said guide members being disposed at diametrically opposite portions of the beads of said tire and adapted to support and guide a portion of an annular elastic inflatable air bag into said tire, and air bag collapsing mechanism including a head element and means for moving said head element in opposite directions at an oblique angle to the plane of one side of the tire mounted on said spreader, said head element being adapted to engage an outer peripheral portion of said air bag on said guide members and move said peripheral portion inwardly toward the diametrically opposite peripheral portion of said air bag during initial movement of said head element in one direction, whereby approximately one-half of said air bag is inverted into nesting relation with the opposite one-half thereof, the air bag moved between said guide members into the interior of the spread tire during continued movement of said head element in said one direction.

2. In a machine for inserting annular inflatable air bags into pneumatic tire casings, a tire spreader including, a relatively stationary portion and a cooperating portion extendable and retractable with respect to said stationary portion, a plurality of forwardly extending inner spreader arms mounted on said relatively stationary portion and having tire bead-engaging elements at the forward ends thereof for engaging circumferentially spaced portions of one of the spaced beads of a tire, a pair of outer spreader arms having their inner ends pivotally mounted on said extensible and retractable member for swinging movements on axes transversely of the direction of extending and retracting movement of said member, said outer arms having forwardly extending portions disposed radially outwardly of the tire to be spread and generally radially inwardly projecting portions pivotally secured to the front ends of said forwardly extending portions on axes generally parallel to the axes of the pivotal connections of said outer arms to said extensible and retractable member, the inner ends of said inwardly projecting arm portions terminating in bead-engaging elements engaging circumferentially spaced portions of the other bead of said tire, and means for imparting movements to said extensible and retractable member to spread the beads of said tire, a pair of spaced guide members mounted on the inner ends of said inwardly projecting arm portions in angularly disposed relationship to said tire and at diametrically opposite portions of the beads of the tire mounted on said spreader, said guide members being adapted to support and guide a portion of an annular elastic inflatable air bag into said tire, and air bag collapsing mechanism including a head element and means for moving said head element in opposite directions at an oblique angle to the plane of one side of the tire mounted on said spreader, said head element being adapted to engage an outer peripheral portion of said air bag on said guide members and move said peripheral portion inwardly toward the diametrically opposite peripheral portion of said air bag during initial movement of said head element in one direction, whereby approximately one-half of said air bag is inverted into nesting relation with the opposite one-half thereof, the air bag moved between said guide members into the interior of the spread tire during continued movement of said head element in said one direction.

3. In a machine for inserting annular inflatable air bags into pneumatic tire casings, a frame including a base and generally upright frame structure, a tire spreader mounted on said base and including a plurality of tire bead-engaging elements, guide means on said spreader at one side of a tire mounted thereon and disposed to lie adjacent a head portion of said tire for guiding an annular elastic inflatable air bag into said tire, a carriage mounted on said frame structure for generally upward and downward movements, a boom mounted on said carriage for common movements therewith and having a downwardly extending free end portion, and a downwardly directed air bag-engaging head element on the free end of said boom, said spreader being disposed to support said tire at an angle relative to the direction of movement of said carriage and head element whereby said head element moves in opposite directions at an oblique angle to the plane of one side of said tire, said head element engaging an outer peripheral portion of an air bag on said guide means and moving said peripheral portion inwardly toward the diametrically opposite peripheral portion thereof during initial movement of said head element in one direction, whereby approximately one-half of said air bag is inverted into nesting relation with the other one-half thereof, the air bag moved into the interior of the spread tire by said head element during continued movement of said head element in said one direction and guided thereinto by said guide means, said head element being movable into the interior of the tire between spread bead portions thereof.

4. In a machine for inserting annular inflatable air bags into pneumatic tire casings, a frame including a base and generally upright frame structure, a tire spreader mounted on said base and including a plurality of tire bead-engaging elements, guide means on said spreader at one side of a tire mounted thereon and disposed to lie adjacent a bead portion of said tire for guiding an annular elastic inflatable air bag into said tire, a carriage mounted on said frame structure for generally upward and downward movements, a boom mounted on said carriage for common movements therewith and having a downwardly extending free end portion, a downwardly directed air bag engaging head element on the free end of said boom, said spreader being disposed to support said tire at an angle relative to the direction of movement of said carriage and head element whereby said head element moves in opposite directions at an oblique angle to the plane of one side of said tire, said head element engaging an outer peripheral portion of an air bag on said guide means and moving said peripheral portion inwardly toward the diametrically opposite peripheral portion thereof during initial movement of said head element in one direction, whereby approximately one-half of said air bag is inverted into nesting relation with the other one-half thereof, the air bag being moved into the interior of the spread tire by said head element during continued movement of said head element in said one direction and guided thereinto by said guide means, said head element being movable into the interior of the tire between spread bead portions thereof, and a rigid leg depending from the intermediate portion of said boom and pivotally secured thereto for swinging movements on a generally horizontal axis, an inverter foot on the lower end of said leg, said foot being adapted to engage the top road-engaging crown surface portion of the tire on said spreader upon swinging movement of said arm to an operative position relative to said boom and to invert the foot engaged portion of said tire responsive to downward movement of said carriage and boom, said leg being movable to an inoperative storage position generally parallel with the adjacent portion of the boom.

References Cited in the file of this patent
UNITED STATES PATENTS

| | | |
|---|---|---|
| 1,847,349 | Maranville | Mar. 1, 1932 |
| 1,943,784 | Branick | Jan. 16, 1934 |